Dec. 10, 1963 H. MILLER 3,114,124

CONTROL WHEEL FORCE TRANSDUCER

Filed Oct. 26, 1959

INVENTOR
HARRY MILLER
BY Henry Huff
ATTORNEY 3,114,124

CONTROL WHEEL FORCE TRANSDUCER

Harry Miller, Scottsdale, Ariz., assignor to Sperry Rand Corporation, Great Neck, N.Y., a corporation of Delaware Filed Oct. 26, 1959, Ser. No. 848,756
8 Claims. (Cl. 336—30)

This invention relates generally to transducers and more particularly to aircraft control wheels which convert axial and tangential forces thereon respectively into pitch and roll command signals.

Aircraft control wheels generally are rotated by application of a tangential force on the wheel to produce roll command signals. To produce pitch command signals, a force parallel to the axis of the wheel, hereinafter called an axial force, is usually applied to the wheel to move the wheel fore and aft. In the ideal case, no roll command signal is generated when an axial force is applied to the wheel and no pitch command signal is generated when a tangential force is applied to the wheel. Also, in the ideal case, the signal outputs from the wheel in both roll and pitch are unaffected when the point of application of force on the wheel is varied.

In practice, it is difficult to isolate the forces tending to pitch the aircraft from the forces tending to roll the aircraft. For instance, rolling the aircraft by turning the control wheel requires the pilot to place his hands on the wheel. Since it is difficult for the pilot to apply only a tangential force on the wheel, a small pitch command signal is generated during the generation of the roll command signal.

It is also difficult in practice to have the roll and pitch command signal outputs remain unaffected when the point of application of the tangential and axial forces on the wheel is varied. For instance, to have the output signal remain unaffected during a pitch command requires that the wheel move parallel to the axis, i.e. fore and aft, for any point of application of axial force on the wheel. Should the pilot apply an axial force on the wheel at only a single point on the wheel, the wheel will tend to pivot about the axis of the wheel. Since the movement of the wheel now is not parallel to the axis of the wheel, an output pitch signal will be generated which differs from an output signal resulting from axial movement of the wheel.

Accordingly, it is a principal object of the present invention to provide a control wheel force transducer whose output signals are unaffected by the point of application of forces on the wheel.

Another object of the invention is to provide a control wheel force transducer which, upon application of an axial force on the wheel, produces only a pitch command signal and, upon application of a tangential force on the wheel, produces only a roll command signal.

Further objects and advantages of the present invention will be apparent from the following description, reference being had to the accompanying drawings which show a preferred form of the present invention.

Figure 1:
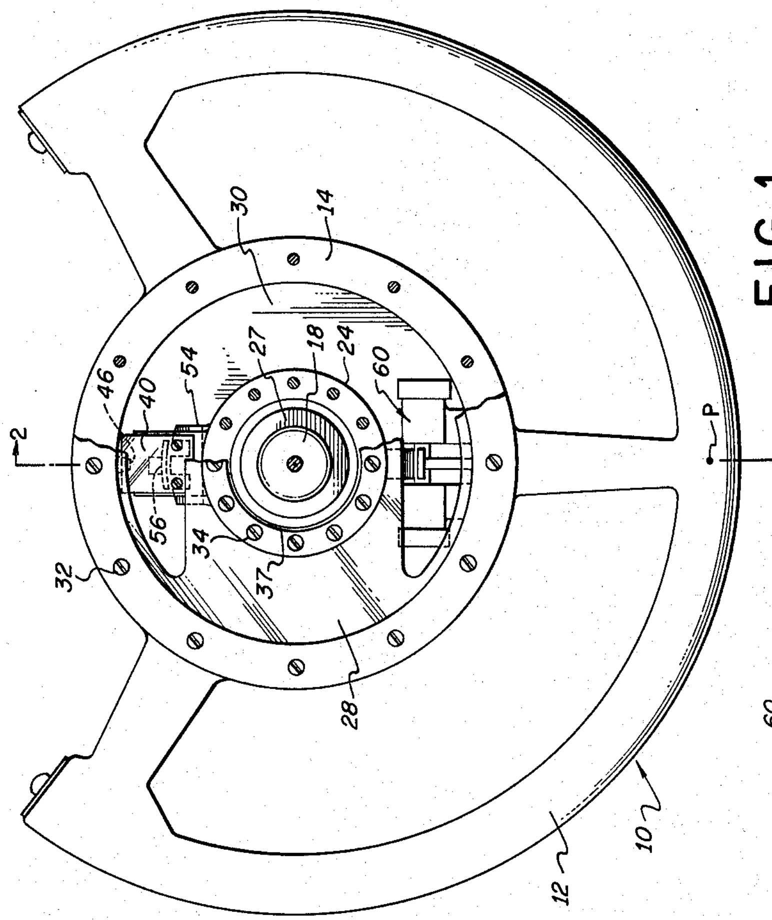
FIG. 1 is a plan view of a control wheel force transducer embodying the invention.
Figure 2:
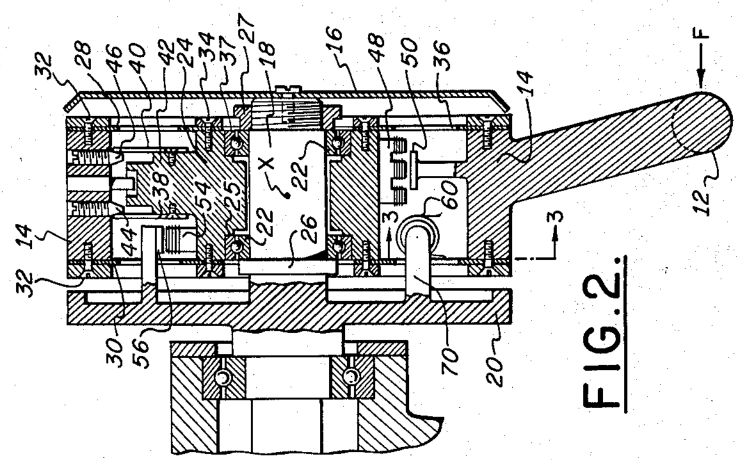
FIG. 2 is a cross-sectional view of the control wheel shown in FIG. 1 taken along line 2—2 of that figure.

Referring to FIGS. 1 and 2, an aircraft control wheel 10 has an outer rim portion 12 and a hub portion 14. A hub cover plate 16 is bolted to the shaft 18 and serves to protect the mechanisms mounted within the hub 14. Shaft 18 also has coupled thereto a circular hub cover 20 which covers the underside of hub 14. The wheel core 24 is rotatably mounted on the shaft 18. Bearings 22 are also mounted on shaft 18 within core recesses 25 and provide easy rotatability of the wheel core 24. Stop 26 on shaft 18 together with nut 27 operate to prevent the bearings 22 and the core 24 from moving axially on the shaft 18. This, therefore, restrains the core 24 to only rotational movement about the shaft 18.

The diaphragms 28 and 30, preferably made of steel, are tensilely stiff, i.e., they substantially do not deform under tensile forces, and are coupled to the wheel hub 14 by screws 32. The diaphragms are also coupled to the core 24 by screws 34 to enable the hub 14 and the core 24 to rotate together when a tangential force is applied to the rim 12. The diaphragms 28 and 30 are provided with cutouts 36 and 37 as shown in FIG. 2.

Flat springs 38 and 40 are bolted to the post 42 which is fixedly mounted to core 24. The springs 38 and 40 respectively engage eccentric elements 44 and 46. Screws 44 and 46, each having a tapered head, are retained in the hub 14 and operate to provide adjustable preloading for pitch command signal generation. Mounted to the core 24 is a conventional E-transformer 48 and mounted to the hub 14 is an armature 50. When no axial force is applied to rim 12, the armature 50 position is such that the signal output from each of the E-transformer's secondary windings is the same. However, when an axial force is applied to rim 12, the armature is shifted relative to the center of E-transformer 48 and the signal outputs from the transformer's secondary windings are unequal. This inequality in signal output is reflected in a pitch command signal. The generation of pitch command signals will be further explained later.

Also mounted to core 24 is a roll axis E-transformer 54. Mounted on hub cover 20 and extending through diaphragm cutout 36 is armature 56. Armature 56 cooperates with E-transformer 54 to generate roll command signals in the same way that armature 50 cooperates with E-transformer 48 to generate pitch command signals. Mounted on hub 14 by means of post 58 is a roll-axis preload element 60.

Figure 3:
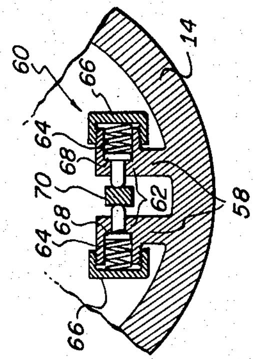
FIG. 3 is a cross-sectional view taken along line 3—3 of FIG. 2 of the device utilized to provide roll-axis preloading of the control wheel force transducer.

Referring to FIG. 3, the preload element 60 is provided with two spacially aligned cylinders 62. In each cylinder 62, a spring 64 is constrained by the nut 66 and the piston face 68. Nuts 66 are each adjustably mounted on the cylinders 62 to provide variable preloading. Each piston face 68 is coupled to the shaft 70 which is mounted on hub cover 20.

In the generation of pitch command signals, the hub 14 is moved axially by the application of axial force on the rim 12. This axial movement occurs regardless of the point of application of axial force on the rim 12. For instance, should an axial force F be applied to the rim 12 at only point P, the wheel, as shown in FIG. 2, will tend to pivot clockwise about point X located on the shaft 18. With one of the diaphragms 28 or 30 missing from the wheel, clockwise motion about point X will certainly occur. However, because of the use of a second diaphragm, no movemnet about point X can occur and the hub 14 and rim 12 are compelled to move axially relative to the core 24 which is prevented from axially moving by stop 26 and nut 27. Such axial movement of the hub 14 and rim 12 results because the diaphragms 28 and 30 are each inflexible to tangential and radial forces, while being flexible in an axial direction. When the axial force F is applied at point P, the diaphragm 28 tends to twist and at the same time rotate the wheel about point X. However, diaphragm 30 because it is coupled to the hub 14 experiences radial force and, being stiff to this force, prevents the wheel 10 from rotating about point X. Since the wheel 10 is unable to rotate about point X, the diaphragm 28 which is mounted to it likewise cannot twist. The force applied at point P can, therefore, only move the hub 14 axially relative to the core 24.

Flat springs 38 and 40, in cooperation with the screws 44 and 46, provide adjustable pre-set forces which must be overcome in order to have axial movement of the hub 14 and the rim 12 relative to the core 24. The pre-set forces may be increased by screwing the screws 44 and 46 further into the hub 14; unscrewing them provides a decreased pre-set force. Should a spurious pitch command force occur, e.g., the pilot resting his hands on the wheel to apply a tangential force on the wheel in roll command signal generation, the pitch E-transformer 48 will produce no pitch command signal unless the spurious pitch command force exceeds the pre-set force of the flat spring 38 against the head of screw 44 or flat spring 40 against the head of screw 46.

Spurious roll command signals are prevented from occurring by the action of pre-load device 60 and shaft 70. For instance, should the pilot apply a tangential force on the wheel by resting his hands on it, the shaft 70 which is mounted on stationary cover 20, will tend to compress the spring 64 because the housing containing the spring 64 is in motion relative to the shaft 70. However, no roll command signal output will occur unless the pre-set force of the spring 64 against the piston face 68 is exceeded. Only when the pre-set force of the spring is exceeded will the wheel be able to rotate and thereby generate a roll command signal.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A steering transducer whose output signals are unaffected by variations in the point of application of force to said transducer comprising spaced apart first and second mounting means, a pair of substantially flat tensilely stiff diaphragms, each diaphragm being mounted substantially parallel to the other on an opposing side of said first and second mounting means, substantially rigid support means for said first mounting means, said support means and said first mounting means being free to move relative to each other except in a direction which is perpendicular to said parallel flat diaghragms, said second mounting means being adapted to have a force applied thereto, the force component perpendicular to the parallel diaphragms being solely capable of moving said second mounting means relative to said support means, means responsive to movement of said second mounting means in a direction which is perpendicular to said parallel flat diaphragms to generate a signal representative of the amount of said movement, and means responsive to relative movement between said support means and said first mounting means to generate a signal representative of the amount of said relative movement.

2. The structure of claim 1 including means coupled to said steering transducer providing a force which acts against the movement of said second mounting means in a direction which is perpendicular to said parallel flat diaphragms and means coupled to said steering transducer providing a force which acts against the relative movement between said first mounting means and said support means.

3. The structure of claim 1 wherein said second mounting means is provided with an orifice extending therethrough and said first mounting means is contained within said orifice.

4. A steering transducer whose output signals are unaffected by variations in the point of application of force to said transducer comprising means provided with a hub and a rim, said hub being provided with an aperture extending through it, a pair of tensilely stiff, but flexible, diaphragms mounted over said aperture, each of said diaphragms being mounted on an opposing side of said hub, said diaphragms each being provided with an aperture, substantially rigid shaft means extending through each of said diaphragm apertures and coupled to said diaphragms at the edges of said diaphragm apertures, said shaft means being fixedly supported, and said rim being adapted to have said force applied thereto, the force component perpendicular to said parallel diaphragms being solely capable of bending said diaphragm and thereby moving said rim in a direction parallel to the longitudinal axes of said shaft, and means responsive to relative movement along the axis of said hub between said rim and hub and said shaft means to produce a signal proportional to the amount of said movement when a force is applied to said transducer tending to move said rim and hub relative to said shaft in the direction of the axis of said hub.

5. The structure of claim 4 wherein said hub aperture is located substantially at the geometrical center of said hub and said diaphragm apertures are each located substantially at the geometrical center of said diaphragms.

6. A steering transducer whose output signals are unaffected by variations in the point of application of force to said transducer comprising means provided with a hub and rim, said hub being provided with an aperture extending through it, said aperture being located substantially at the geometrical center of said hub, substantially rigid shaft means, core means rotatably mounted on said shaft means and positioned within said hub aperture, a pair of resilient, but otherwise tensilely stiff, diaphragms each mounted substantially parallel to the other to respectively couple opposing faces of said hub to opposing faces of said core means, said rim being adapted to have applied thereto a force only the tangential and axial components of which are effective in moving said hub relative to the longitudinal axis of said shaft means, said tangential component operating to rotate said hub and said axial force operating to move translationally said hub along the axis of said shaft, means responsive to movement of said hub in the direction of said shaft means to produce a signal proportional to the amount of said movement, and means responsive to rotational movement of said hub about said shaft to produce a signal proportional to the amount of said movement.

7. The structure of claim 6 including means coupled to said core means and to said hub to provide an adjustable force which acts against the movement of said hub in the direction of said shaft means, and means coupled to said shaft to provide an adjustable force which acts against the rotational movement of said hub about said shaft.

8. A steering transducer whose output signals are unaffected by variations in the point of application of force to said transducer and which is unresponsive to small spurious forces comprising cylindrical hub means, said hub means being provided with an aperture extending through it along the axis of said hub means, a pair of resilient, but tensilely stiff, diaphragms mounted on said hub, each of said diaphragms being mounted at opposing ends of said hub and covering said hub aperture, each of said diaphragms being also provided with an aperture, substantially rigid shaft means extending through each of said diaphragm apertures, core means rotatably mounted on said shaft means and positioned between said diaphragms within said hub aperture, said core means being also coupled to each of said diaphragms, said hub means being adapted to have applied thereto a force only the tangential and axial components of which are effective in moving said hub means, means secured to said hub means and said core means to produce a signal proportional to the amount of relative movement in the direction of said shaft between said hub and core means, means secured to said shaft means and said core means to produce a signal proportional to the amount of rotational movement of said hub means on said shaft means, and adjustable spring loaded means coupled to said shaft means to provide an adjustable force which acts against the rotational movement of said hub means on said shaft means.

References Cited in the file of this patent

UNITED STATES PATENTS

| | | |
|---|---|---|
| 2,696,592 | Petroff | Dec. 7, 1954 |
| 2,785,356 | Nisle | Mar. 12, 1957 |
| 2,861,756 | Feucht | Nov. 25, 1958 |
| 2,885,163 | De Haven | May 5, 1959 |
| 2,937,577 | Morgan | May 24, 1960 |
| 2,944,432 | Rintoul | July 12, 1960 |